United States Patent
Bowen et al.

(10) Patent No.: US 11,936,642 B2
(45) Date of Patent: Mar. 19, 2024

(54) DEVICE LEVEL VARIABLE ROLE-BASED ACCESS SYSTEMS, METHODS, AND APPARATUSES

(71) Applicant: Schweitzer Engineering Laboratories, Inc., Pullman, WA (US)

(72) Inventors: David J. Bowen, Minesing (CA); David J. Dolezilek, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 302 days.

(21) Appl. No.: 17/231,227

(22) Filed: Apr. 15, 2021

(65) Prior Publication Data

US 2022/0337575 A1  Oct. 20, 2022

(51) Int. Cl.
H04L 9/40 (2022.01)

(52) U.S. Cl.
CPC .......... *H04L 63/083* (2013.01); *H04L 63/101* (2013.01); *H04L 63/105* (2013.01); *G06F 2221/2141* (2013.01)

(58) Field of Classification Search
CPC ... H04L 63/083; H04L 63/101; H04L 63/105; H04L 63/18; H04L 2463/082; G06F 2221/2141

See application file for complete search history.

(56) References Cited

U.S. PATENT DOCUMENTS

| | | | |
|---|---|---|---|
| 7,698,555 B2 | 4/2010 | Jiang | |
| 8,677,464 B2 | 3/2014 | Smith | |
| 8,793,767 B2 | 7/2014 | Schweitzer | |
| 9,130,945 B2 | 9/2015 | Smith | |
| 10,862,825 B1 | 12/2020 | Gammel | |
| 2006/0274939 A1* | 12/2006 | Yamada | H04N 1/0087 382/175 |
| 2008/0162930 A1* | 7/2008 | Finney | H04L 63/083 726/4 |
| 2021/0075618 A1* | 3/2021 | Stephenson | H04L 63/0846 |
| 2021/0120001 A1 | 4/2021 | Gammel | |
| 2022/0311615 A1* | 9/2022 | Gordon | H04L 9/0822 |

OTHER PUBLICATIONS

Henry et al., IEEE 2019, "A Case Study of Implementing Cybersecurity Best Practices for Electrical Infrastructure in a Refinery", pp. 103-107 (Year: 2019).*

Nakao, Mark; Loo, Simon; Melville, Lee: "Integrating Modern Substation Automation Systems with Enterprise-Level Management" Mar. 2015.

Shaffer, Dalton; Thewlis, Devin; Bartman, Tom; Atiyeh, Tristan: "Solving Performance and Cybersecurity Challenges in Substation and Industrial Networks with Software-Defined Networking" Mar. 2020.

* cited by examiner

*Primary Examiner* — Khalil Naghdali
(74) *Attorney, Agent, or Firm* — Stoel Rives LLP; Richard M. Edge (57) ABSTRACT

Embodiments herein include an intelligent electronic device (IED) by employing a multi-factor authentication process. In some embodiments, to change the access level of the IED, the user may use the password and additional inputs such as an off-site operator sending a command, or the user engaging a push button or switch local to the IED.

20 Claims, 5 Drawing Sheets

DEVICE LEVEL VARIABLE ROLE-BASED ACCESS SYSTEMS, METHODS, AND APPARATUSES

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

An electric power system (sometimes herein "power system") may incorporate a variety of control, monitoring, and/or communication technologies and devices that may be used to control, monitor, automate, and communicate information, for example, to protect the power system.

Electric power systems are designed to generate, transmit, and distribute electrical energy to loads. Electric power systems may include equipment such as: electrical generators, electrical motors, power transformers, power transmission and distribution lines, circuit breakers, switches, busses, voltage regulators, capacitor banks, and the like. Such equipment may be monitored, controlled, automated, and/or protected using one or more intelligent electronic devices (IEDs) that may receive electric power delivery system information from the equipment, make decisions based on the information, and provide monitoring, control, protection, and/or automation outputs to the equipment.

The operation of an IED is performed by people accountable for the consequences of these commanded controls and access to certain functions of each IED at any given time are generally protected based on password access at the client computer that allows the user access for the purpose of sending commands to the device. In some instances, the commanded control client such as SCADA, also confirms that the client server exchange with the device has appropriate access permission to send command messages with access security. Separate from commanded control, client server device configuration text and file exchange is commonly referred to as engineering access (EA) and is often a dialogue between a user and the device. Each device can support numerous EA user connections via device front panel HMI or remote HMI EA software interface via serial and Ethernet communications connections. These serial and Ethernet communications connections to a remote HMI EA software interface may be direct or networked connections and may be arrive to the device as plain text or encrypted characters. A setting in the IED determines the maximum access level that the EA user is allowed to reach and each level is associated with permission to control and configure certain device functions The setting may be changed by someone accountable and with the password associated with the role of making changes to the IED that determine user access restrictions. For example, IEDs may be configured to have a variable MAXACC that defines the maximum access level that each EA user is allowed to reach in the IED. During local and remote EA communications with the IED, a user has knowledge of passwords to gain a specific level of functionality, based on that user's role, responsibility, and accountability, and what access each password allows in the IED. The MAXACC setting may further restrict access to the IED regardless of the users' knowledge of passwords. When a user has knowledge of passwords that would allow operation of the IED or changes to the configuration of the IED but this access is higher than the MAXACC, these passwords are defeated and access is prevented regardless of the method of communications to the IED and if the communications is otherwise considered legitimate, authenticated, encrypted, or otherwise secure. The access level may be set to a value that prevents access to the IED, allows read only access, or limits whether the IED can be configured. Typically, the maximum access level will be set to limit changes to the IED to prevent the IED from being vulnerable to undesired manipulation. When a user actually needs to configure the IED, the user enters a password to log in to the IED and issues a command to change the access level.

However, this is undesirable for several reasons. For example, in some instances the password may be transmitted in the clear, meaning that messages to and from the IED are designed to travel over a private link, and for useability are not encrypted, so the characters of the password, and other messages, are visible to someone else on that private link. Therefore, if an IED is deployed in a communications system without private links to the IED and that allows someone to remain undetected as they create a method to eavesdrop on the private link communications with an IED, and they eavesdrop at the specific time that the password is communicated; this password can be observed and potentially used by an unauthorized user to gain access if no other authentication methods exist. This introduces a vulnerability to hacking. As another example, in some instances an unauthorized user or user authorized to use the remote HMI but not authorized to modify the IED and with access to the passwords will be able to send valid and encrypted traffic to the device which the device cannot prevent because authentication is done at the client computer. This introduces a vulnerability to unauthorized device access by user that has gained access to a remote EA HMI. As another example, at certain times even authorized changes may be undesirable. For instance, if testing is occurring that may be affected by an IED configuration change, it would be desirable to prevent that configuration change. Further, it may be desirable to dynamically change access capability. Additionally, a single password is inherently less secure than using multi-factor authentication.

Embodiments herein improve the security of an IED by employing a multi-factor authentication process. In some embodiments, to change the access level of the IED, the user may use the password and additional inputs such as an off-site operator sending a command, or the user engaging a push button or switch local to the IED. Thus, even if an unauthorized user obtains the password and access to a remote EA HMI, the unauthorized user still cannot gain access to the IED and authorized users can also be prevented from unintended access.

In some embodiments, an IED may include, for example, remote terminal units, differential relays, distance relays, directional relays, feeder relays, overcurrent relays, voltage regulator controls, voltage relays, breaker failure relays, generator relays, motor relays, bay controllers, meters, recloser controls, governors, exciters, statcom controllers, static VAR compensator (SVC) controllers, on-load tap changer (OLTC) controllers, and the like. Further, in some embodiments, IEDs may be communicatively connected via a data transmission network that includes, for example, multiplexers, routers, hubs, gateways, firewalls, and/or switches to facilitate communications on the network. Networking and communication devices may also be integrated into an IED and/or be in communication with an IED. As used herein, the term IED may refer to a single discrete IED or to a system of multiple IEDs operating together.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. In addition, the terms "comprising" and "including" are open ended and even may allow for the inclusion of elements similar to recited elements but having different characteristics and/or configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that perform one or more tasks or implement particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Figure 1:
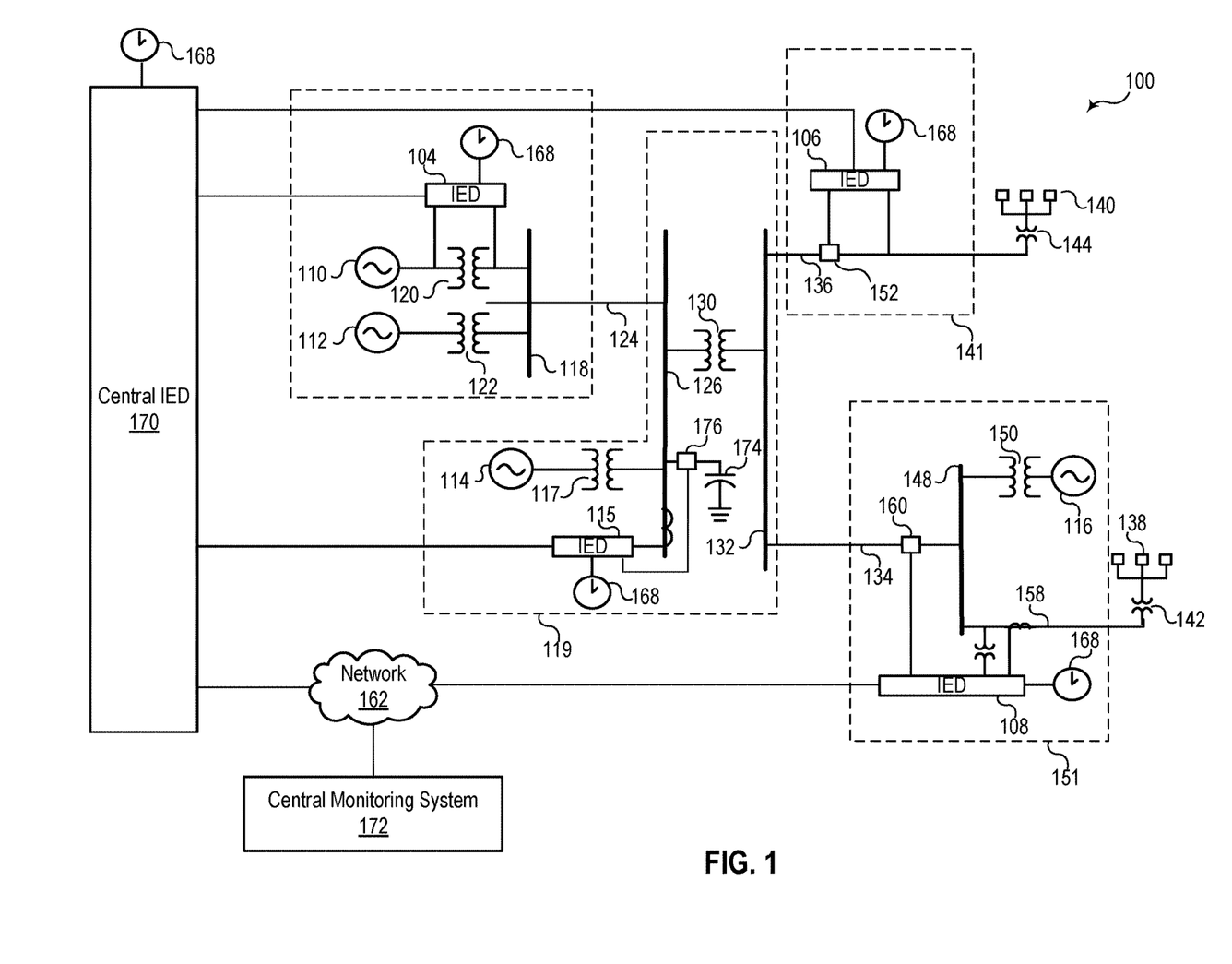
FIG. 1 illustrates a simplified diagram of one embodiment of an electric power delivery system that includes intelligent electronic devices consistent with embodiments disclosed herein.

FIG. 1 illustrates an embodiment of a simplified one-line diagram of an electric power transmission and distribution system 100 in which a plurality of communication devices facilitate communication in a software-defined network (SDN) consistent with embodiments of the present disclosure. The electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144, and 150), power transmission and delivery lines (e.g., lines 124, 134, and 158), circuit breakers (e.g., breakers 152, 160, and 176), busses (e.g., busses 118, 126, 132, and 148), loads (e.g., loads 140 and 138) and the like. A variety of other types of equipment may also be included in the electric power delivery system 100, such as voltage regulators, capacitor banks, and a variety of other types of equipment.

A substation 119 may include a generator 114, which may be a distributed generator, and which may be connected to the bus 126 through a step-up transformer 117. The bus 126 may be connected to a distribution bus 132 via a step-down transformer 130. Various distribution lines 136 and 134 may be connected to the distribution bus 132. The distribution line 136 may lead to a substation 141 and the line may be monitored and/or controlled using an IED 106, which may selectively open and close a breaker 152. A load 140 may be fed from the distribution line 136. A step-down transformer 144 in communication with the distribution bus 132 via the distribution line 136 may be used to step down a voltage for consumption by the load 140.

The distribution line 134 may lead to a substation 151 and deliver electric power to the bus 148. The bus 148 may also receive electric power from the distributed generator 116 via a transformer 150. The distribution line 158 may deliver electric power from the bus 148 to the load 138 and may include another step-down transformer 142. The circuit breaker 160 may be used to selectively connect the bus 148 to the distribution line 134. The IED 108 may be used to monitor and/or control the circuit breaker 160 as well as the distribution line 158.

The electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal 168 may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The common time signal 168 may be distributed in system 100 using a communications network 162 or using a common time source, such as a Global Navigation Satellite System (GNSS), or the like. The common time signal 168 may be distributed using, for example, PTP or NTP protocols.

According to various embodiments, the central monitoring system 172 may comprise one or more of a variety of types of systems. For example, central monitoring system 172 may include commanded control clients such as a local and remote supervisory control and data acquisition (SCADA) system and/or a wide area control and situational awareness (WACSA) system. The central monitoring system 172 may also include engineering software tools that communicate with the IED using an EA file transfer or terminal text string command or character mode in which input typed by the user is sent to the IED over a communication channel. Text received by the IED is acted on by the IED in accordance with access and response parameters including the access level of the user connection. A central IED 170 may be in communication with IEDs 104, 106, 108, and 115. IEDs 104, 106, 108 and 115 may be remote from the central IED 170 and may communicate over various media such as a direct communication from IED 106 or over a wide-area communications network 162, such as via a virtual private network (VPN). According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via the network 162 may be facilitated by networking devices. Examples of networking devices include, but are not limited to, multiplexers, routers, hubs, gateways, firewalls, and switches. In some embodiments, IEDs and networking devices may comprise physically distinct devices. In other embodiments, IEDs and networking devices may be composite devices or may be configured in a variety of ways to perform overlapping functions. IEDs and networking devices may comprise multi-function hardware (e.g., processors, computer-readable storage media, communications interfaces, etc.) that can be utilized to perform a variety of tasks that pertain to network communications and/or the operation of equipment within system 100.

Consistent with embodiments disclosed herein, IEDs 104, 106, 108, 115, and 170 may be configured to prevent unauthorized access to change an access level of the IED using multi-factor authorization. Each access level may allow certain activities. For example, a level 1 access may allow read only access while a level 2 access may allow read/write access.

As discussed in greater detail below, systems and methods consistent with the present disclosure may be configured to require an out-of-band input to alter the access level. For example, an onsite switch and/or a local or remote SCADA command may be used to alter the IEDs reaction to a change access level request received during an EA dialogue.

The MAXACC port setting can be used to limit the maximum access level permitted on a port regardless of the user, access to the device local HMI, access to the remote EA HMI, the users knowledge of passwords, the type of communications connection or protocol used, and whether or not the messages are encrypted. This can be useful to restrict what access level users can attain and therefore what users can do. For example, a user may be able to change the IED to Access Level 1 (ACC) using a password and another input to be able to gain access to some parameters while the user may change the IED to Access Level 2 (2AC) to have access to additional parameters. If, however, the MAXACC is set to (ACC) the user will be prohibited from attaining Access Level 2 because it is above the maximum allowed by the IED configuration of MAXACC=ACC.

Figure 2:
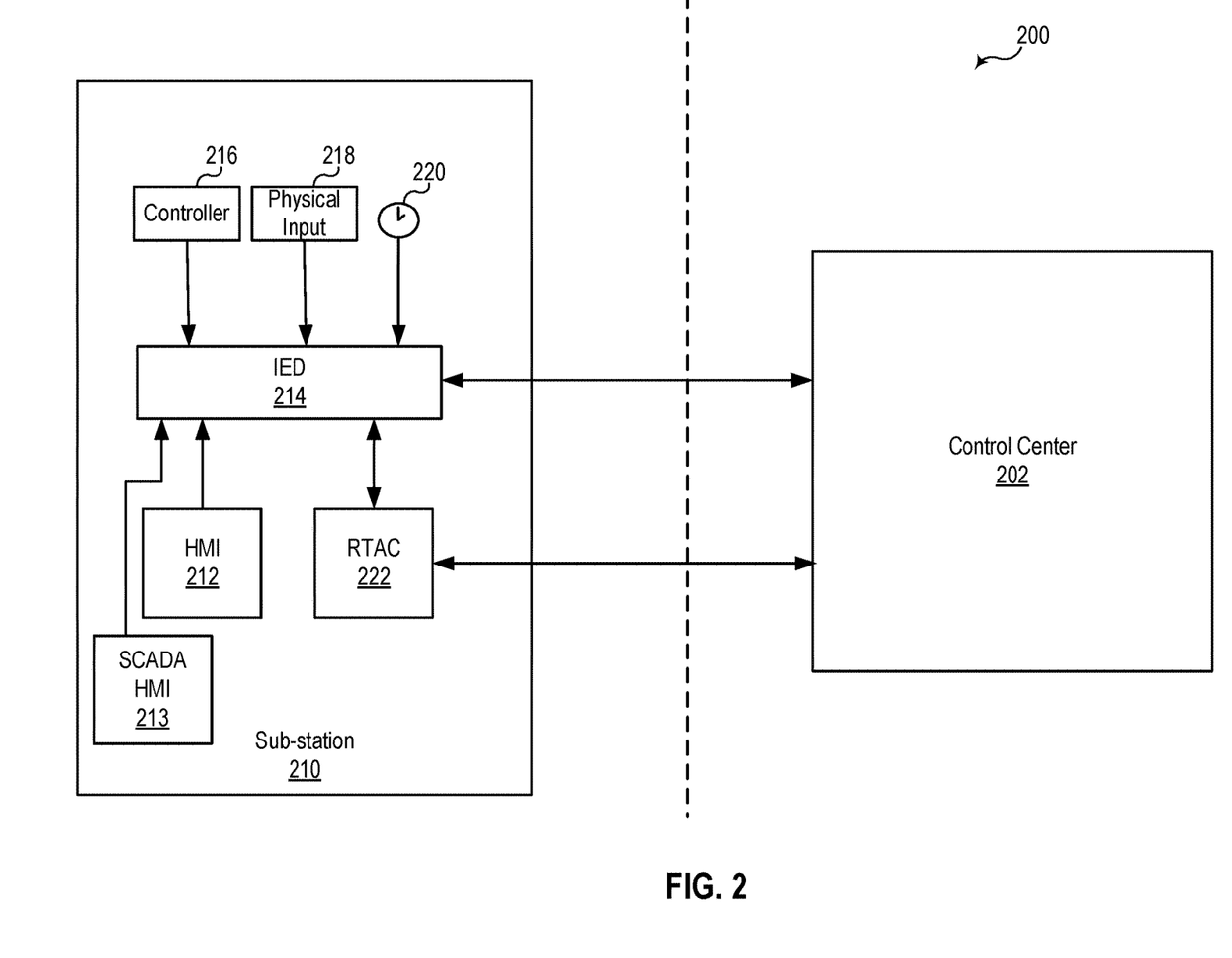
FIG. 2 illustrates a block diagram of a system for controlling an access level of an intelligent electronic device (IED) in accordance with one embodiment.

FIG. 2 illustrates a block diagram of a system 200 for controlling an access level of an IED 214. The IED 214 may be in communication with multiple external devices that may be sources of input. As shown, the IED 214 may receive inputs from a variety of local and remote sources.

To increase security, in some embodiments credentials or permissions from multiple sources may be needed to permit a user to change the access level of the IED 214. In some embodiments, the local sources may include devices local to a sub-station 210. The local sources may include one or more of a EA human media interface (HMI) 212, a controller 216, a physical input 218, a clock 220, and a real-time automation controller (RTAC) 222. The controller 216 may include an HMI and virtual switches. The physical input 218 may include a keypad, a button, and/or a switch. The remote source may include a control center 202 and be connected to the IED 214 via a supervisory control and data acquisition (SCADA) network.

The EA HMI 212 may be used by a user to access and configure the IED 214. The user may be required to enter a password into the EA HMI 212 in order to enter commands for the EA IED 212. In addition to the password received by the EA HMI 212, to be able to access and/or configure the IED 214, the IED 214 may check a status of one or more access control variables.

The access control variables may control an access level of the IED 214. For example, the access control variables may include a first access control variable enable ACC (EACC) and a second access control variable enable 2AC (E2AC). The EACC variable may enable an ACC command from the EA HMI 212 to proceed to change the access level of the IED 214 to level 1. The E2AC variable may enable a 2AC command from the EA HMI 212 to proceed to change the access level of the IED 214 to level 2. In some embodiments, the EACC variable and the E2AC variable may be set to 1, which would allow access and configuration of the IED 214.

The access control variables may be set to relay word bits, process variables, or remote bits (e.g., RB01 and RB02). The remote bits may be a set of bits internal to the IED that are also controllable by external sources through the network interface. These remote bits may represent a physical input and may be used in logic equations. Thus, security for the IED 214 may be configured by defining a logic equation that uses a remote bit. The logic equations may depend on input from one or more of the local and remote sources. For example, the logic equations may require that a switch or button from the physical input 218 be activated. In other words, flipping a switch may be used to set the remote bits. As another example, an RTAC 222 or SCADA HMI 213 that includes role-based access control (RBAC) and encryption may set the remote bits based on the role of the user.

In some embodiments, setting the remote bits may be controlled by the clock 220. For example, the remote bit may be only able to be set to enabled at certain times of the day. In some embodiment, the remote bits may revert to disabled after a certain duration of time.

In some embodiments, the control center 202 may control the remote bits settings. For example, to allow access to the relay 214 a user may have to call into the control center 202 to gain authorization. The control center 202 may send a DNP or IEC 61850 MMS control to set the remote bit that allows access level one or two as requested by the user. Thus, the remote bits may be set via an out-of-band input relative to the EA HMI 212.

In some embodiments, a combination of inputs may be needed to change the access level of the IED 214. For example, the IED 214 may require a password from the EA HMI 212 to allow a user to access a command interface. The user may be able to request a change in the access level of the IED 214 via the command interface. However, remote bits stored by the IED 214 are used to determine whether the request from the user should be able to proceed. The remote bits may be controlled by one or more external devices. For example, the logic equation may require that a switch from the physical input 218 be in a first position, the user has a specific role defined in the RTAC 222, and the control center 202 has sent an access permitted command.

Thus, multi-factor authorization for changing access level of an IED 214 may be instituted. For example, in the illustrated embodiment, the IED 214 may have enhanced security by requiring three-factor credentials (e.g., something the user has: access to the remote EA HMI, such as EA HMI 212, interface based on employee username and password authorized by the owners trust management system; something the user knows: device password for IED access level ACC, something the user is: recognized and authorized employee granted permission based on operator out of band interaction with IED).

In some embodiments, the enable access control bits EACC and E2AC may be disabled on power-up if set to enabled prior to a device experiencing a power cycle.

In some embodiments, a log of the remote bits may be kept. This may allow the system 200 to track who and when altered the access level of the IED 214. For example, the RTAC 222 may track changes to the remote bits, track the time of the changes, and track what user was logged onto the HMI 212. The bits may be tracked in a system log.

Additionally, in some embodiments, the system 200 may also track unauthorized access. For example, if a password is entered into the HMI but an input from an external device (e.g., physical input 218, controller 216, clock 220, control center 202) is not received by the IED 214, the RTAC 222 or the IED 214 may set off an alarm. The alarm may include communicating the attempted access to the control center or a technician's personal electronic device (e.g., cell phone, laptop, tablet, etc.).

Figure 3:
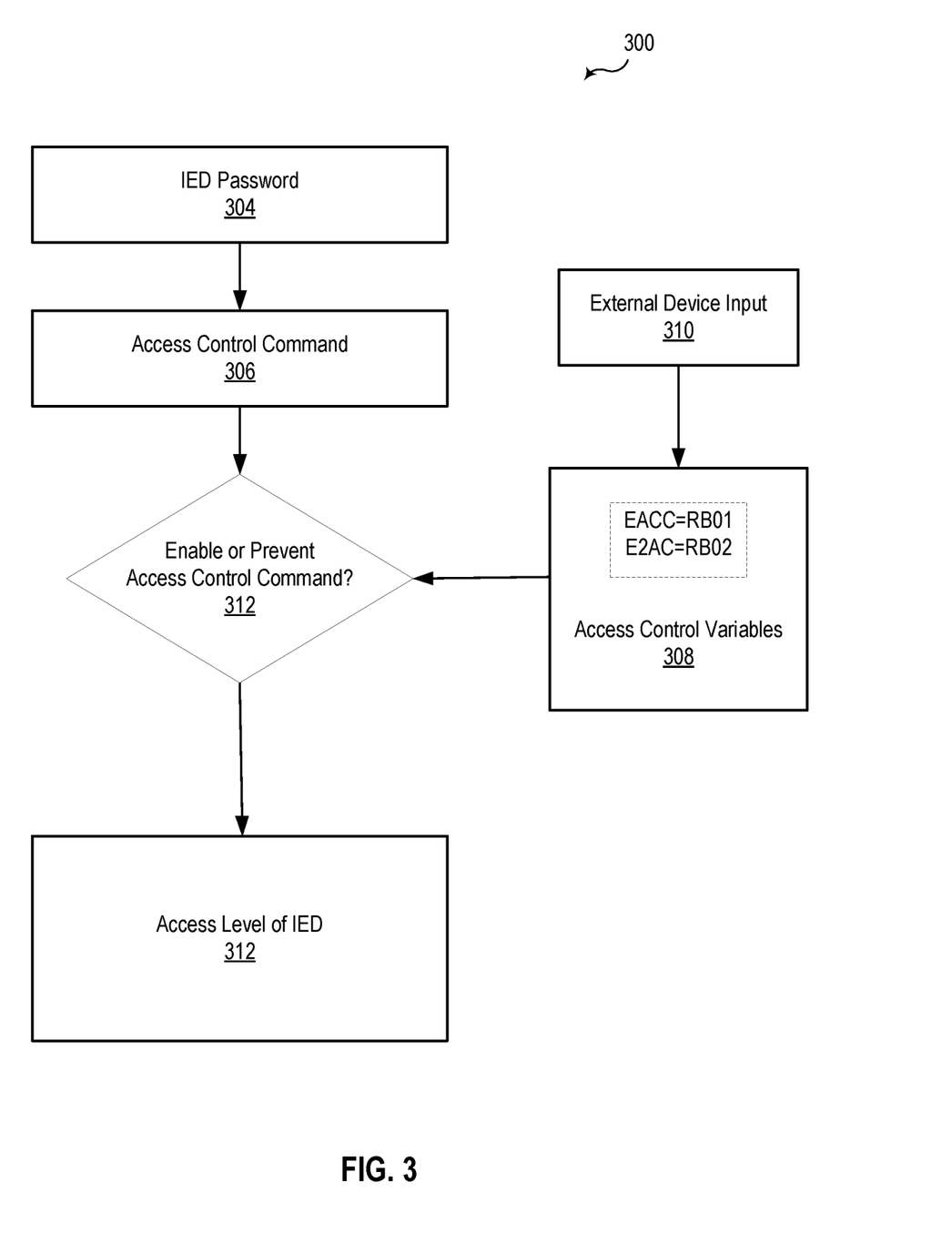
FIG. 3 illustrates a signal flow diagram for changing an access level of an IED using remote bits in accordance with one embodiment.

FIG. 3 illustrates a signal flow diagram 300 for changing an access level of an IED using remote bits according to one embodiment. (304 and 306 are out of order and drawing is missing MAXACC check) As shown, an IED may receive an IED password access command 306 and prompt the user to enter the password 304. The IED password 304 may be a password that provides access to a command interface of the IED.

The command interface may allow a user to attempt to issue commands to the IED. For example, the command interface may receive an access control command 306. The access control command 306 may be a request to change the access level of the IED. For example, the IED may be set to a no-access level, a read only access level, or a read/write access level (e.g., level 1 access and level 2 access).

However, before a change in access level is granted, the IED may check whether one or more access control variables 308 are enabled or disabled. The IED may store the set of access control variables 308. For example, EACC and E2AC may be two variables that control whether the IED may be set to level 1 access and level 2 access respectively. Setting EACC to high, 1, or enabled may allow the IED to enter a level 1 access state, while setting E2AC to high, 1, or enabled may allow the IED to enter a level 2 access state. Setting EACC to low, 0, or disabled may prevent the IED from entering a level 1 access state, while setting E2AC to low, 0, or disabled may prevent the IED from entering a level 2 access state.

The access control variables 308 may each be set to a remote bit. In the illustrated embodiment, the access control variables 308 are set to remote bit one and remote bit two. In other embodiments, different remote bits may be used. Remote bits are data values that may be controlled by an external device input 310. For example, the remote bit may be enabled or disabled based on a position of a switch, a time of day, or a command from an external controller such as a control center. In addition, the remote bits may be set to be enabled or disabled based on a combination of multiple external device inputs. For example, the remote bit may be used to define a logic equation that requires a SCADA command and a button to be pressed. The network or interface on which the external device input 310 is received may be different than the network or interface on which the IED password 304 is received.

The IED may enable the access control command to proceed or prevent the access control command from proceeding 312 based on the one or more access control variables 308. For example, if the access control command 306 is a command to set the IED to access level 1 and the remote bit one is set to enable, the access level of the IED 312 may be changed to access level 1 if allowed by MAXACC setting. Similarly, if the access control command 306 is a command to set the IED to access level 2 and the remote bit two is set to enable, the access level of the IED 312 may be changed to access level 2. However, if the access control command 306 is a command to set the IED to access level 2, the remote bit one is set to enable, and the remote bit two is set to disable, the access level of the IED 312 may be prevented from entering to access level 2 regardless of MAXACC setting.

Figure 4:
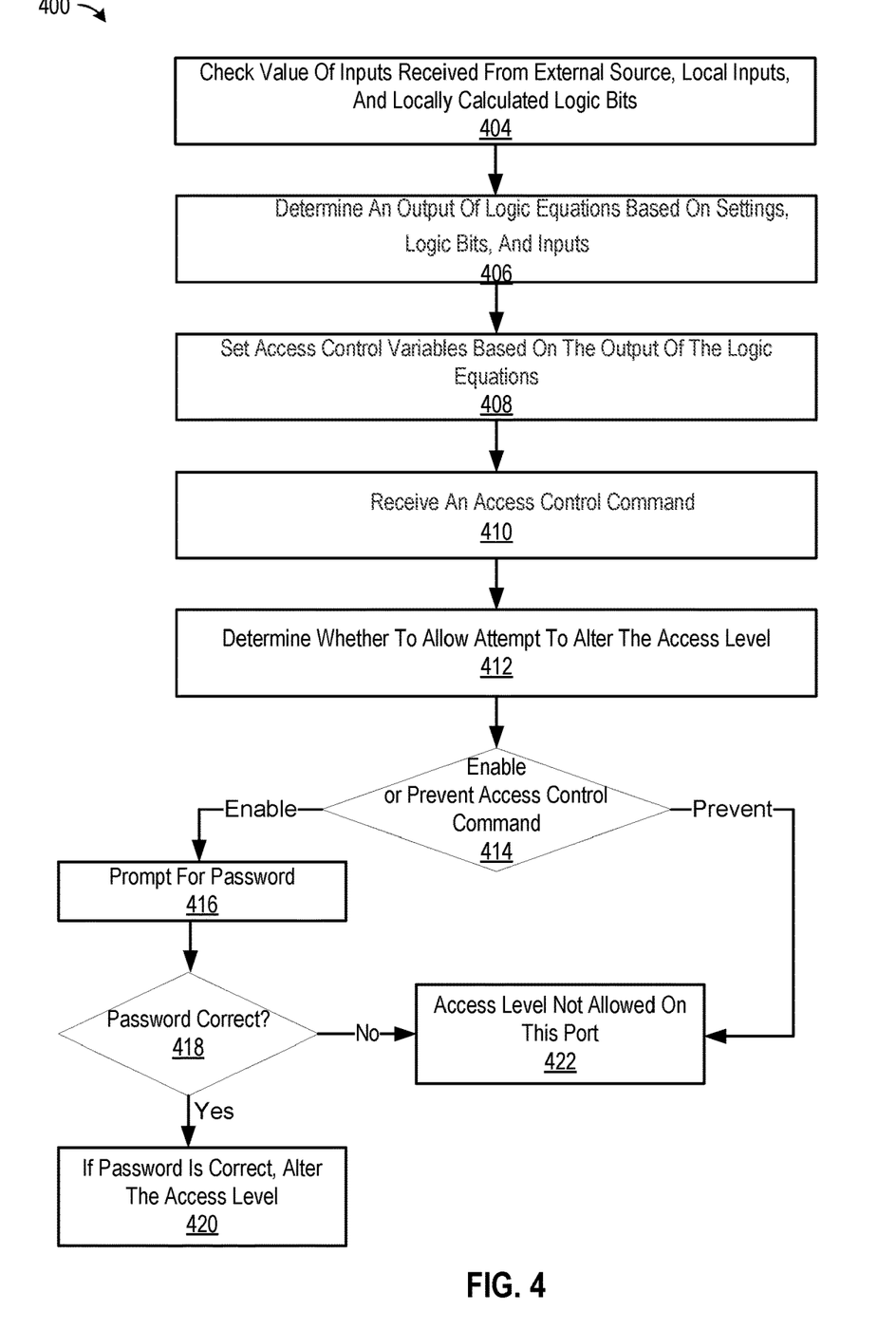
FIG. 4 illustrates a flow chart of a method for altering an access level of an IED in accordance with one embodiment.

FIG. 4 illustrates a flow chart of a method 400 for altering an access level of an IED. The method 400 may be executed by an IED. For example, an IED may receive user inputs via a command interface. The command interface is an interface where a user may issue commands to the IED. For example, the EA command interface may receive commands to publish a system log, alter an access level, or generate an error report.

The IED may receive and check 402 a value of inputs from an external source, local input, or locally calculated logic bit. For example, the IED may receive an input from one or more of a button, switch, clock, controller, RTAC, local algorithm, or a control center. The input may be out-of-band relative to the password. For example, the input from the external source may be received via a first network and the password may be received via a second network.

The IED may determine 406 an output of logic equations based on settings, logic bits, and input from the various sources. A set of control variables may be set by logic equations controlled by remote bits. The control variables may enable or disable changes to an access level of the IED.

The IED may set 408 access control variables based on the output of the logic equations. The access control variables may comprise a first access control variable that controls level 1 access to the IED and a second access control variable that controls level 2 access to the IED. Accordingly, when the IED receives 410 an access control command via the command interface that requests a change in an access level of the IED, the IED may determine 412 whether allow attempt to alter the access level based on a status of the one or more access control variables.

The IED may either enable or prevent 414 an access control command based on the determination. If it is enabled, the IED may prompt 416 for a password. For example, an IED may receive and compare a text input to a password access control command to determine 418 whether access to an EA command interface of the IED should be considered permitted. If the password is correct, the IED may alter 420 the access level. If the password is not correct or if the IED determines that the access control command should be prevented, the IED may cause 422 the access level to not be allowed on the port.

In some embodiments, the IED is further to monitor changes to the one or more access control variables and record the changes in a system log. In some embodiments, the IED is further check employee credentials before allowing a user to enter the access control command.

Figure 5:
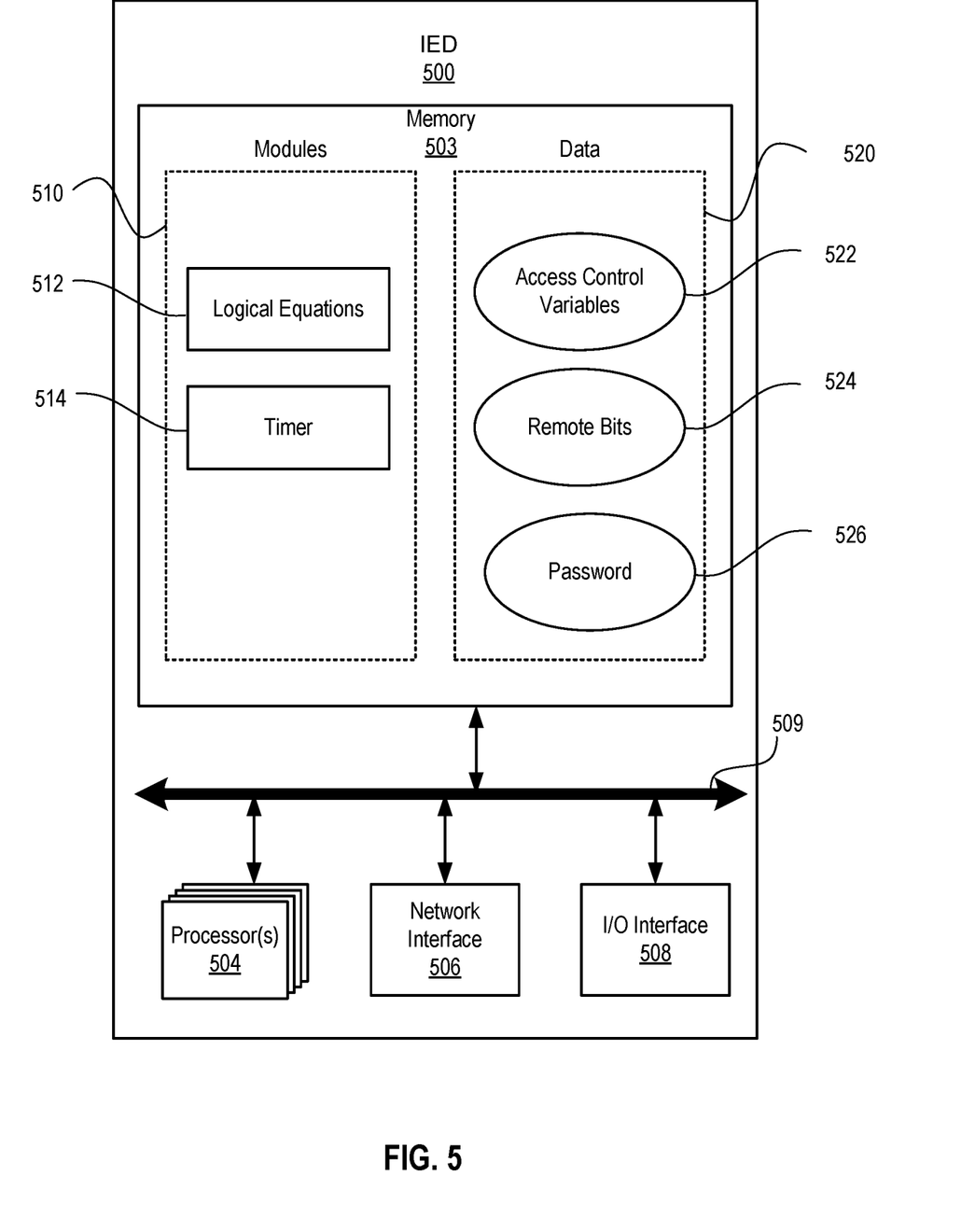
FIG. 5 is a block diagram of an IED in accordance with one embodiment.

FIG. 5 is a block diagram of an IED 500 according to one embodiment. The IED 500 may perform the methods and use the techniques described with reference to the other figures in the specification. The IED 500 can include a memory 503, one or more processors 504, a network interface 506, an input/output interface 508, and a system bus 509.

The one or more processors 504 may include one or more general purpose devices, such as an Intel®, AMD®, or other standard microprocessor. The one or more processors 504 may include a special purpose processing device, such as ASIC, SoC, SiP, FPGA, PAL, PLA, FPLA, PLD, or other customized or programmable device. The one or more processors 504 can perform distributed (e.g., parallel) processing to execute or otherwise implement functionalities of the presently disclosed embodiments. The one or more processors 504 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 503 may include static RAM, dynamic RAM, flash memory, one or more flip-flops, ROM, CD-ROM, DVD, disk, tape, or magnetic, optical, or other computer storage medium. The memory 503 may include a plurality of program modules 510 and program data 520. The memory 503 may be local to the IED 500, as shown, or may be distributed and/or remote relative to the IED 500.

Data generated or used by the IED 500, such as by the program modules 510 or other modules, may be stored on the memory 503, for example, as stored program data 520. The data 520 may be organized as one or more databases.

The data 520 may include access control variables 522, remote bits 524, and a password 526. The control variables 522 may include variables that may be enabled or disabled to allow or prevent the IED 500 from entering access levels. The remote bits 524 may be a set of bits that are controllable by external sources through the network interface 506. In some embodiments, an access control variable may be set to a value of a remote bit. The password 526 may be a string of characters that allows access to the IED.

The modules 510 may comprise logical equations 512 and a timer 514. The logical equations may define the one or more inputs from external sources that are used to set the remote bits 524. The timer 514 may cause the access level of the IED to revert after a period of time.

The program modules 510 may run multiple operations concurrently or in parallel by or on the one or more processors 504. In some embodiments, portions of the disclosed modules, components, and/or facilities are embodied as executable instructions embodied in hardware or firmware, or stored on a non-transitory, machine-readable storage medium. The executable instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems, and/or the like.

The input/output interface 508 may facilitate user interaction with one or more input devices and/or one or more output devices. For example, a user may enter the password 526 using the input/output interface 508. The input device(s) may include a keyboard, mouse, touchscreen, light pen, tablet, microphone, sensor, or other hardware with accompanying firmware and/or software. The output device(s) may include a monitor or other display, printer, speech or text synthesizer, switch, signal line, or other hardware with accompanying firmware and/or software. For example, in one embodiment, the input/output interface 508 comprises a display to provide a graphical user interface (GUI) illustrating the potential ablation perimeters. The input/output interface 508 can receive the user input data. In some embodiments, the input/output interface 508 is a touchscreen, and the size input is received via the touchscreen. In some embodiments, the input/output interface 508 can superimpose the target ablation perimeters on an image of the tissue.

The network interface 506 may facilitate communication with other computing devices and/or networks and/or other computing and/or communications networks. The network interface 506 may be equipped with conventional network connectivity, such as, for example, Ethernet (IEEE 5102.3), Token Ring (IEEE 5102.5), Fiber Distributed Datalink Interface (FDDI), or Asynchronous Transfer Mode (ATM). Further, the network interface 506 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 509 may facilitate communication and/or interaction between the other components of the IED 500, including the one or more processors 504, the memory 503, the input/output interface 508, and the network interface 506.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/ or processor executable instructions.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. An intelligent electronic device (IED) comprising
memory to store a password associated with a maximum access setting corresponding to a maximum access level that a user is allowed to reach in the IED, and one or more electronic access control variables, wherein the one or more access control variables control an access level of the IED, and the one or more access control variables are set based on logic equations;
a first communication interface configured to couple the IED to an Engineering Access Human Media Interface (EA HMI);
a second communication interface configured to couple the IED to an external source and receive an input for the logic equations from the external source;
a processor to:
receive the input from the external source or local source;
determine an output of the logic equations based on the input from one or more of the external source, the local source, or locally calculated logic equations;
set the one or more access control variables based on the output of the logic equations;
receive an access control command that requests a change in the access level of the IED;
compare a text input from the EA HMI to the password; and
enable the access control command to proceed or prevent the access control command from proceeding regardless of the maximum access level indicated by the maximum access setting based on the one or more access control variables and a result of the comparison of the test input from the EA HMI to the password.

2. The IED of claim 1, wherein the logic equations are set according to one or more local or remote bits that are bits internal to the IED and that are controllable locally or remotely via the second communication interface.

3. The IED of claim 1, wherein the one or more access control variables comprises a first access control variable that controls level 1 access to the IED and a second access control variable that controls level 2 access to the IED.

4. The IED of claim 1, wherein the processor is further to monitor changes to the one or more access control variables and record the changes in a system log.

5. The IED of claim 1, wherein the processor is further to detect unauthorized access and set the one or more access control variables to prevent the access control command from proceeding.

6. The IED of claim 1, wherein the processor is further check employee credentials before allowing a user to enter the access control command.

7. The IED of claim 1, wherein the input from the external source is received from one or more of a SCADA HMI or a switch local to the IED or a control center.

8. The IED of claim 1, wherein the input from the external source is received via a first network and the password is received via a second network.

9. A method for an intelligent electronic device (IED), the method comprising:
   evaluating local inputs and those received from an external source;
   determining an output of logic equations based on the input from one or more of the external source, the local source, or locally calculated logic equations;
   setting one or more access control variables based on the output of the logic equations;
   receiving an access control command that requests a change in an access level of the IED;
   comparing a text input to a password associated with a maximum access setting corresponding to a maximum access level that a user is allowed to reach in the IED to determine whether a user is authorized to request the change in the access level; and
   determining whether the access control command should be permitted to alter the access level based on the one or more access control variables regardless of the maximum access level indicated by the maximum access setting associated with the password.

10. The method of claim 9, wherein the logic equations are set to one or more bits internal to the IED and controllable via the external source.

11. The method of claim 9, wherein the one or more access control variables comprises a first access control variable that controls level 1 access to the IED and a second access control variable that controls level 2 access to the IED.

12. The method of claim 9, further comprising monitoring changes to the one or more access control variables and recording the changes in a system log.

13. The method of claim 9, further comprising detecting unauthorized access and setting the one or more access control variables to prevent the access control command from proceeding.

14. The method of claim 9, further comprising checking employee credentials before allowing a user to enter the access control command.

15. The method of claim 9, wherein the input from the external source is received from one or more of a switch local to the IED or a control center.

16. The method of claim 9, wherein the input from the external source is received via a first network and the password is received via a second network.

17. A non-transitory computer-readable storage medium, the computer-readable storage medium including instructions that when executed by a computer, cause the computer to:
   receive an input from an external source;
   determine an output of logic equations based on the input from one or more of the external source, the local source, or locally calculated logic equations;
   set one or more access control variables based on the output of the logic equations;
   receive an access control command that requests a change in an access level of the IED;
   compare a text input to a password associated with a maximum access setting corresponding to a maximum access level that a user is allowed to reach in the IED to determine whether a user is authorized to request the change in the access level; and
   determine whether the access control command should be permitted to alter the access level based on the one or more access control variables regardless of the maximum access level indicated by the maximum access setting associated with the password.

18. The computer-readable storage medium of claim 17, wherein the one or more access control variables comprises a first access control variable that controls level 1 access to the IED and a second access control variable that controls level 2 access to the IED.

19. The computer-readable storage medium of claim 17, wherein the one or more access control variables comprises a first access control variable that controls level 1 access to the IED and a second access control variable that controls level 2 access to the IED.

20. The computer-readable storage medium of claim 17, wherein the input from the external source is received from one or more of a switch local to the IED or a control center.

* * * * *